United States Patent
Fujino

[11] Patent Number: 6,074,446
[45] Date of Patent: Jun. 13, 2000

[54] FUEL CHARCOAL

[76] Inventor: Masao Fujino, 19-8, Aobadainishi 3 chome, Wakamatsu-ku, Kitakyushu-shi, Fukuoka 808-0143, Japan

[21] Appl. No.: 09/179,633

[22] Filed: Oct. 27, 1998

[30] Foreign Application Priority Data

Oct. 29, 1997 [JP] Japan .................................. 9-314428

[51] Int. Cl.[7] .................................. C10L 5/36; C10L 9/00
[52] U.S. Cl. .................................. 44/522; 44/520; 44/530; 44/532
[58] Field of Search .................................. 44/530, 532, 520, 44/522

[56] References Cited

U.S. PATENT DOCUMENTS

| | | | |
|---|---|---|---|
| 1,780,205 | 11/1930 | Maurel | 44/530 |
| 3,028,228 | 4/1962 | Chaplin | 44/530 |
| 3,492,134 | 1/1970 | Brummendorf | 44/530 |
| 3,883,317 | 5/1975 | Neme | 44/520 |
| 4,478,601 | 10/1984 | Stephens | 44/530 |
| 4,834,774 | 5/1989 | Fay, III et al. | 44/530 |

*Primary Examiner*—Ellen M. McAvoy
*Attorney, Agent, or Firm*—Armstrong, Westerman, Hattori, McLeland & Naughton

[57] ABSTRACT

Fuel charcoal having a plurality of air-passing portions in the shape of through holes or grooves in its body so as to supply combustion air thereto while burning, by which it keeps a burning state once catching fire.

5 Claims, 2 Drawing Sheets

FUEL CHARCOAL

BACKGROUND OF THE INVENTION

The present invention relates to fuel charcoal which is easy to catch fire and, once fired, keeps the fire long.

Charcoal is made from wood by carbonization. Normally, miscellaneous trees such as oak and beech are used as the material of charcoal and, though having fine voids inside, such trees are solid. As a result, in the use of charcoal, plural pieces of the charcoal having a proper length must be collected and fired. Thus, by keeping a state of being collected, the charcoal continues to burn.

In the case of using the charcoal for the heat source of cooking, it is convenient to use one or two pieces of charcoal or plural pieces of charcoal by putting them in nearly parallel without collecting them but giving a bit of space between them.

However there is a problem that a piece of or plural pieces of charcoal arranged with space is impossible to keep a burning state because, even if fire is set in some way at first, ash adheres on the surface of burning charcoal and extinguishes it.

SUMMARY OF THE INVENTION

The present invention has been made under such circumstances and, accordingly, it is an object of this invention to provide fuel charcoal which keeps a burning state by only one piece.

The fuel charcoal according to aforesaid object has a plurality of air-passing portions for leading combustion air inside the charcoal body.

Here, said air-passing portions may be a plurality of through holes. In this case, it is desirable that said plurality of through holes are formed in parallel, by which it is easy to form the air-passing portions, that is, the through holes by use of a multi spindle drilling machine, or the like.

In addition, it is possible to form said air-passing portions by providing a lot of grooves in the body of said charcoal, through which air can pass. In this case, the grooves are formed in the charcoal body by use of a saw or the like.

As explained above, in the fuel charcoal according to the present invention, since a lot of air-passing portions are formed in the charcoal body, combustion air passes through those portions and, furthermore, because the burning portions of the charcoal body are heated by each other, each piece of charcoal becomes easy to catch fire and, once fired, keeps a burning state.

In addition, because the volatile matter generated during combustion burns in the air-passing portions, very little amount of smoke is generated and no wind is required for keeping a burning state, which makes it possible to use this fuel charcoal not only outdoors but also indoors.

Furthermore, the present invention is applicable to the case wherein said charcoal is put in an open-top container made of aluminum or steel and, in this case, said container can be used as a portable charcoal stove.

BEST MODE FOR CARRYING OUT THE INVENTION

Then the example that embodies the present invention will be explained for the purpose of good understanding of this invention.

Figure 1:
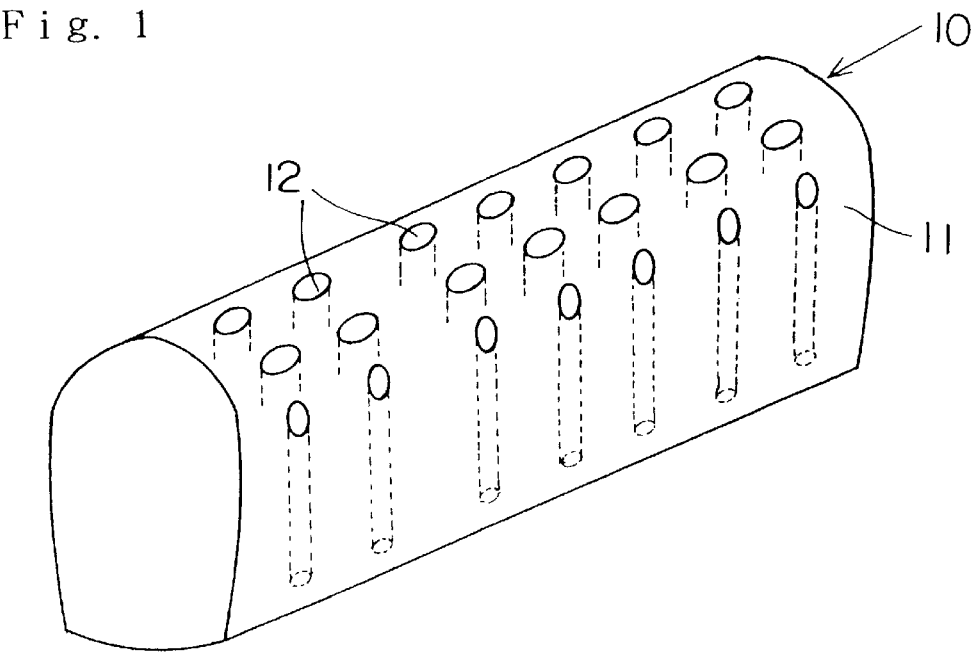
FIG. 1 is a perspective view of the fuel charcoal relating to the first embodiment of the present invention.
Figure 2:
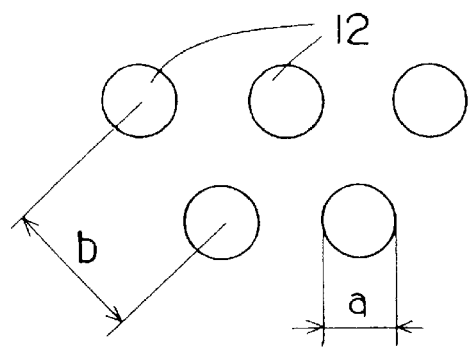
FIG. 2 is a drawing showing the arrangement of air-passing portions formed through the fuel charcoal of the same.

As shown in FIG. 1, the fuel charcoal 10 according to the first embodiment of the present invention comprises the charcoal body 11 which is made from wood by carbonization. The charcoal body 11 is provided with a plurality of vent holes 12 each of which is one example of an air-passing portion. In this embodiment, as shown in FIG. 2, the diameter "a" of each vent hole 12 is 5 to 10 mm and the pitch "b" between vent holes is 15 to 20 mm. By use of a multi-spindle drilling machine, a plurality of vent holes 12 is opened at the same time. In addition, the diameter of each vent hole and the pitch between vent holes are to be determined depending on the shape and size of charcoal and, therefore, the present invention is not limited to the dimensions stated above.

The vent holes 12 may be formed to charcoal or to material, that is, wood. If the vent holes 12 are formed after the material has been made into charcoal, the cutting chip becomes powder, which is difficult to reuse and, moreover, the wear of drill blade is fast. On the other hand, if the vent holes are formed when the material is in the state of wood, the cutting chips do not become powder and they are possible to be active carbon by carbonization and, furthermore, the wear of drill blade is slow. In this case there is an advantage that the carbonization time becomes shorter because the heating effect is improved by the vent holes formed beforehand.

Figure 3:
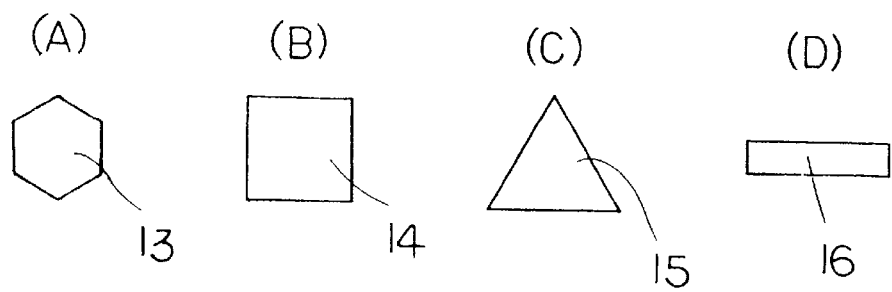
FIG. 3 is a drawing showing the different types of air-passing portions formed through the fuel charcoal of the same.

FIG. 3 shows the various cross sectional shapes of said vent hole, wherein (A) shows a vent hole 13 having a hexagonal cross section, (B) shows a vent hole 14 having a square cross section, (C) shows a vent hole 15 having a triangular cross section and (D) shows a vent hole 16 having a rectangular cross section. However other shapes are applicable and, therefore, the present invention is not limited to the cross sectional shape of the vent hole.

Here the shape of the fuel charcoal 10 in this embodiment is that of natural wood. However, if a wooden pillar, column, etc. for example is carbonized, the fuel charcoal has consequently a square cross section. Therefore the present invention is not limited to its shape and accordingly it is applicable to the fuel charcoal in the shape of a lump including its "broken piece".

Then the method of using the fuel charcoal 10 will be explained hereunder. The fuel charcoal 10 in which a plurality of vent holes 12 is formed is put on a gas range and fired. In this case, even a single piece of fuel charcoal 10 catches fire easily and, by the effect of vent holes 12, it keeps a burning state.

Figure 4:
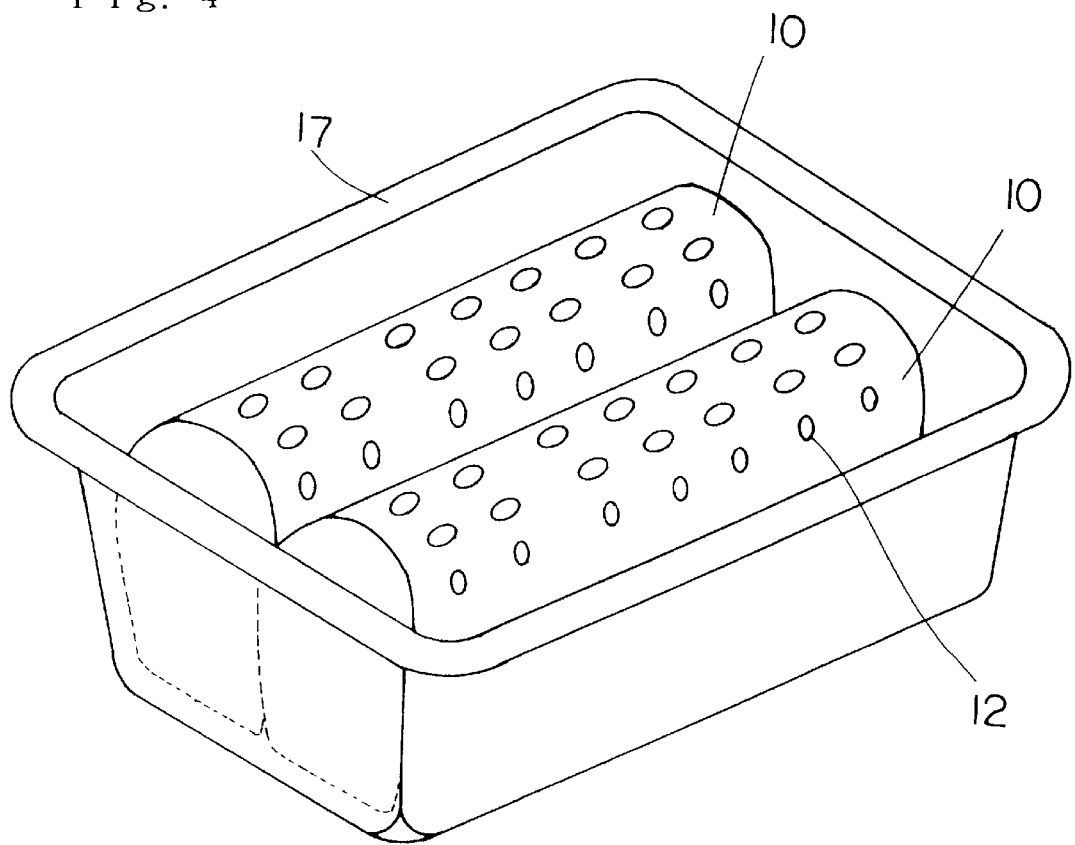
FIG. 4 is a drawing explaining the state in use of the fuel charcoal of the same.

FIG. 4 shows a portable charcoal stove in which two pieces of the fuel charcoal 10 are put in the container 17 made of aluminum or steel. In this case, one piece of fuel charcoal may be put in the container. In another case, by putting two or more pieces of fuel charcoal 10 in the container 17, the heating surface area is effectively enlarged. In this case, if providing a proper number of vent holes to the bottom or side faces of the container 17, the combustion of the fuel charcoal 10 becomes much more effective. By use of this portable charcoal stove, it is possible to make a pot-boiled dish or, by putting a proper wire gauze on top of the container 17, to grill fish and meat.

Figure 5:
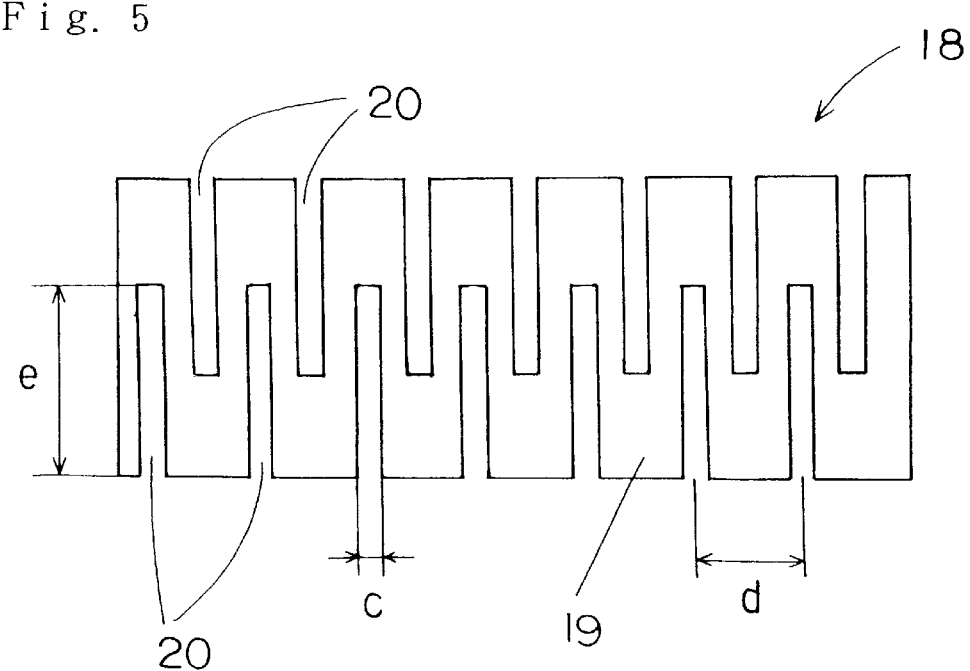
FIG. 5 is a plan view of the fuel charcoal relating to the second embodiment of the present invention.

FIG. 5 shows the fuel charcoal 18 relating to the second embodiment of the present invention, wherein grooves 20 each of which is an example of an air-passing portion are formed with proper pitches to the charcoal body 19. Since enough amount of air must pass through the grooves 20, it is preferable that the width "c" of each groove is 2 to 5 mm, the pitch "d" is 10 to 20 mm at one side and the depth "e" is $2/5$ to $4/5$ of the diameter of the fuel charcoal 18. In this case, once catching fire, a single piece of the fuel charcoal 18 keeps a burning state even if left as it is.

What is claimed is:

1. Fuel charcoal comprising charcoal made from wood by carbonization having a plurality of air-passing portions for leading combustion air inside the charcoal.

2. Fuel charcoal according to claim 1, wherein said air-passing portions comprise a plurality of through holes.

3. Fuel charcoal according to claim 2, wherein said plurality of through holes is formed in parallel.

4. Fuel charcoal according to claim 1, wherein said air-passing portions comprise grooves formed in said charcoal.

5. A fuel charcoal package, comprising fuel charcoal and an open-top container made of aluminum or steel, said fuel charcoal comprising charcoal made from wood by carbonization having a plurality of air-passing portions for leading a combustion air inside the charcoal.

* * * * *